(12) United States Patent
Mizuno et al.

(10) Patent No.: US 8,393,591 B2
(45) Date of Patent: Mar. 12, 2013

(54) SEAT SLIDE APPARATUS FOR VEHICLE

(75) Inventors: Ryousuke Mizuno, Toyota (JP); Hideo Nihonmatsu, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 76 days.

(21) Appl. No.: 13/036,323

(22) Filed: Feb. 28, 2011

(65) Prior Publication Data

US 2011/0233367 A1    Sep. 29, 2011

(30) Foreign Application Priority Data

Mar. 25, 2010    (JP) ................. 2010-070858

(51) Int. Cl.
*F16M 13/00* (2006.01)
*A47C 1/00* (2006.01)

(52) U.S. Cl. ..................... 248/424; 297/344.1

(58) Field of Classification Search ............... 297/344.1, 297/344.13, 344.14, 344.11; 248/424, 429, 248/419, 422, 430; 296/65.13, 65.14, 65.09
See application file for complete search history.

(56) References Cited

U.S. PATENT DOCUMENTS

| | | | |
|---|---|---|---|
| 7,000,880 B2 * | 2/2006 | Jaudouin ................ | 248/429 |
| 7,717,490 B2 | 5/2010 | Kojima et al. | |
| 2004/0124683 A1 * | 7/2004 | Matsumoto et al. ....... | 297/344.1 |

FOREIGN PATENT DOCUMENTS

JP    2008-247143    10/2008

OTHER PUBLICATIONS

U.S. Appl. No. 13/036,313, filed Feb. 28, 2011, Mizuno, et al.
U.S. Appl. No. 13/036,390, filed Feb. 28, 2011, Nihonmatsu, et al.
U.S. Appl. No. 13/036,527, filed Feb. 28, 2011, Nihonmatsu, et al.

* cited by examiner

*Primary Examiner* — Joshua J Michener
*Assistant Examiner* — Erin W Smith
(74) *Attorney, Agent, or Firm* — Oblon, Spivak, McClelland, Maier & Neustadt, L.L.P.

(57) ABSTRACT

A seat slide apparatus for a vehicle includes a first rail, a second rail, a lock member, a plurality of engagement bores including a rear end engagement bore, a front end portion of the rear end engagement bore being further positioned in a forward direction than a rear end of the second rail in a state where the second rail is positioned at a foremost position, a rear end portion of the rear end engagement bore being exposed to a rear of the rear end of the second rail, a memory member, a holding member holding the memory member to move integrally with the second rail or holding the memory member to engage with one of the engagement bores, and an auxiliary bracket restricting a movement of the memory member that engages with the front end portion of the rear end engagement bore towards the rear end portion thereof.

6 Claims, 11 Drawing Sheets

Front side ←      → Rear side

Front side ←      → Rear side

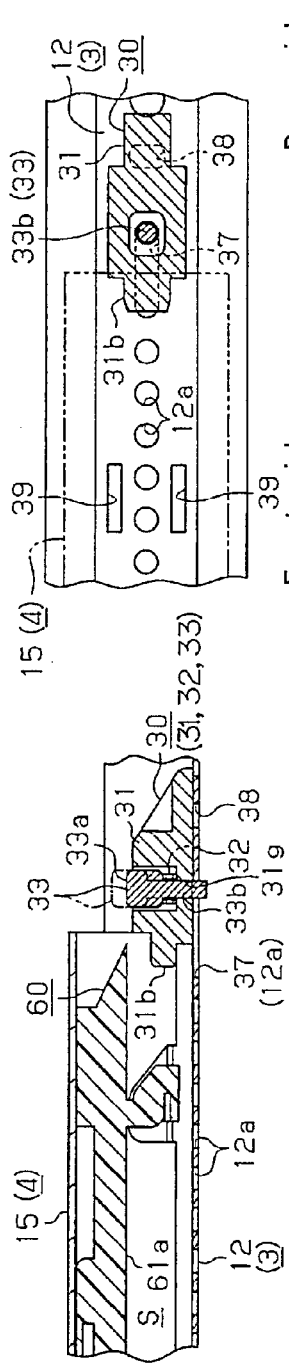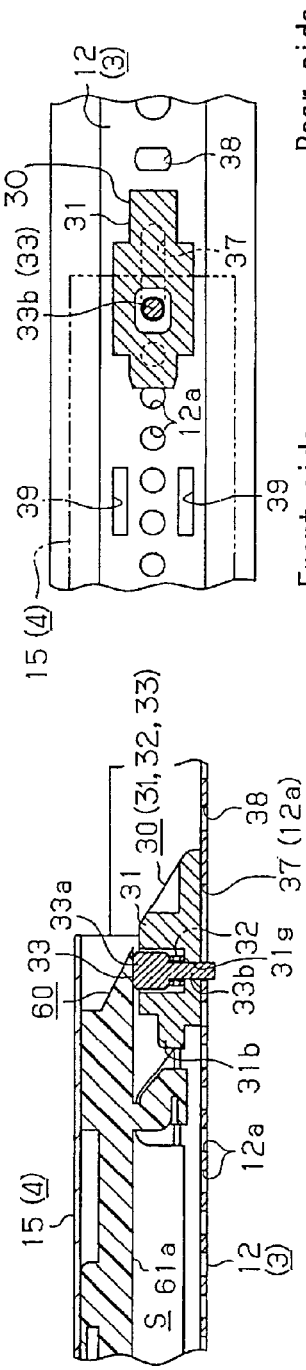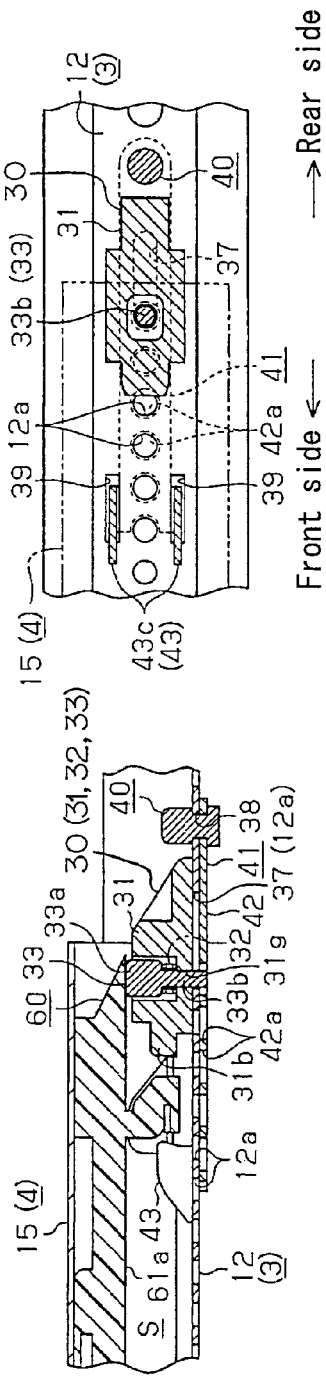

SEAT SLIDE APPARATUS FOR VEHICLE

CROSS REFERENCE TO RELATED APPLICATIONS

This application is based on and claims priority under 35 U.S.C. §119 to Japanese Patent Application 2010-070858, filed on Mar. 25, 2010, the entire content of which is incorporated herein by reference.

TECHNICAL FIELD

This disclosure relates to a seat slide apparatus for a vehicle.

BACKGROUND DISCUSSION

A known seat slide apparatus for a vehicle is disclosed in JP2008-247143A (which will be hereinafter referred to as Reference 1), for example. The seat slide apparatus disclosed in Reference 1 includes a lower rail fixed to a vehicle floor and an upper rail fixed to a vehicle seat and supported by the lower rail so as to be movable relative to the lower rail. The seat slide apparatus also includes a lock member that restricts a relative movement between the lower rail and the upper rail. The restriction of the relative movement between the lower rail and the upper rail by the lock member (i.e., a locked state of the lock member) is released, for example, by an operation of an operation handle by an occupant seated on the aforementioned vehicle seat.

Further, the seat slide apparatus disclosed in Reference 1 includes a memory member that moves on the lower rail in association with the movement of the upper rail during a normal slide operation where the occupant seated on the vehicle seat, for example, releases the lock member (as a result, the lock member is brought to an unlocked state to thereby permit the relative movement between the lower rail and the upper rail) so as to adjust the position of the vehicle seat. The memory member is accommodated within an inner void formed by the lower rail and the upper rail and having a box shape. The memory member is fixed to the lower rail at a time of a walk-in operation where a seat back of the vehicle seat is folded forward so that a passenger gets in or out of a rear seat in the rear of the vehicle seat, for example, and the lock member is released and locked in association with a forward folding operation of the seat back.

After the passenger gets in or out of the rear seat, the upper rail (i.e., the vehicle seat) is moved to an original position where the upper rail again engages with the memory member (i.e., a memory position) and thereafter the seat back is pulled up from the forwardly folded state. Then, the lock member is again brought to the locked state so that the movement of the upper rail relative to the lower rail is restricted.

Specifically, an arrangement range of the memory member is defined so that the memory member is prevented from being exposed to a rear of the vehicle seat, i.e., beyond a rear end of the upper rail even in a case where the memory member is fixed to a rearmost portion of the lower rail at a time when the upper rail moves to a foremost position relative to the lower rail by the walk-in operation.

According to the seat slide apparatus disclosed in Reference 1, the memory member is assembled in view of an assembly process of the lower rail and the upper rail, which may decrease an assembly performance of the memory member. In order to prevent the memory member from being exposed beyond the rear end of the upper rail, the memory member is assembled in a state where the upper rail is moved further forward than the foremost position where the forward movement of the upper rail is structurally stopped. Thereafter, the upper rail is moved rearward so that the memory member is inserted and positioned within the upper rail. That is, after the upper rail and the lower rail are assembled and therefore the forward movement of the upper rail relative to the lower rail is restricted to the foremost position, it may be impossible to assemble the memory member.

A need thus exists for a seat slide apparatus for a vehicle which is not susceptible to the drawback mentioned above.

SUMMARY

According to an aspect of this disclosure, a seat slide apparatus for a vehicle includes a first rail, a second rail movable relative to the first rail, a lock member restricting a relative movement between the first rail and the second rail, a plurality of engagement bores formed at a bottom wall portion of the first rail at predetermined intervals in a longitudinal direction of the first rail and including a rear end engagement bore that extends in a rearward direction of the vehicle from a point away from one of the engagement bores arranged next to the rear end engagement bore by the predetermined interval, a front end portion of the rear end engagement bore being further positioned in a forward direction of the vehicle than a rear end of the second rail in a state where the second rail is positioned at a foremost position relative to the first rail, a rear end portion of the rear end engagement bore being exposed to a rear of the rear end of the second rail, the rear end engagement bore being arranged at a rearmost side among the engagement bores, a memory member movably supported within an inner void that is formed between the first rail and the second rail in the longitudinal direction of the first rail, the memory member being prevented from moving by an engagement with one of the engagement bores, a holding member fixed to the second rail and holding the memory member to move integrally with the second rail in a state where a restriction of the relative movement between the first rail and the second rail by the lock member is released on a basis of an operation of an operation handle, the holding member holding the memory member to engage with one of the engagement bores in a state where the restriction of the relative movement between the first rail and the second rail by the lock member is released in association with a forward folding operation of a seat back of a seat configured to be fixed to the second rail, and an auxiliary bracket fixed to the bottom wall portion of the first rail and restricting a movement of the memory member that engages with the front end portion of the rear end engagement bore towards the rear end portion thereof.

BRIEF DESCRIPTION OF THE DRAWINGS

The foregoing and additional features and characteristics of this disclosure will become more apparent from the following detailed description considered with the reference to the accompanying drawings, wherein:

FIG. 14A is a longitudinal sectional view and a plan view illustrating an assembly of the seat slide apparatus according to the embodiment;

FIG. 14B is a longitudinal sectional view and a plan view illustrating the assembly of the seat slide apparatus according to the embodiment; and FIG. 14C is a longitudinal sectional view and a plan view illustrating the assembly of the seat slide apparatus according to the embodiment.

DETAILED DESCRIPTION

Figure 13:
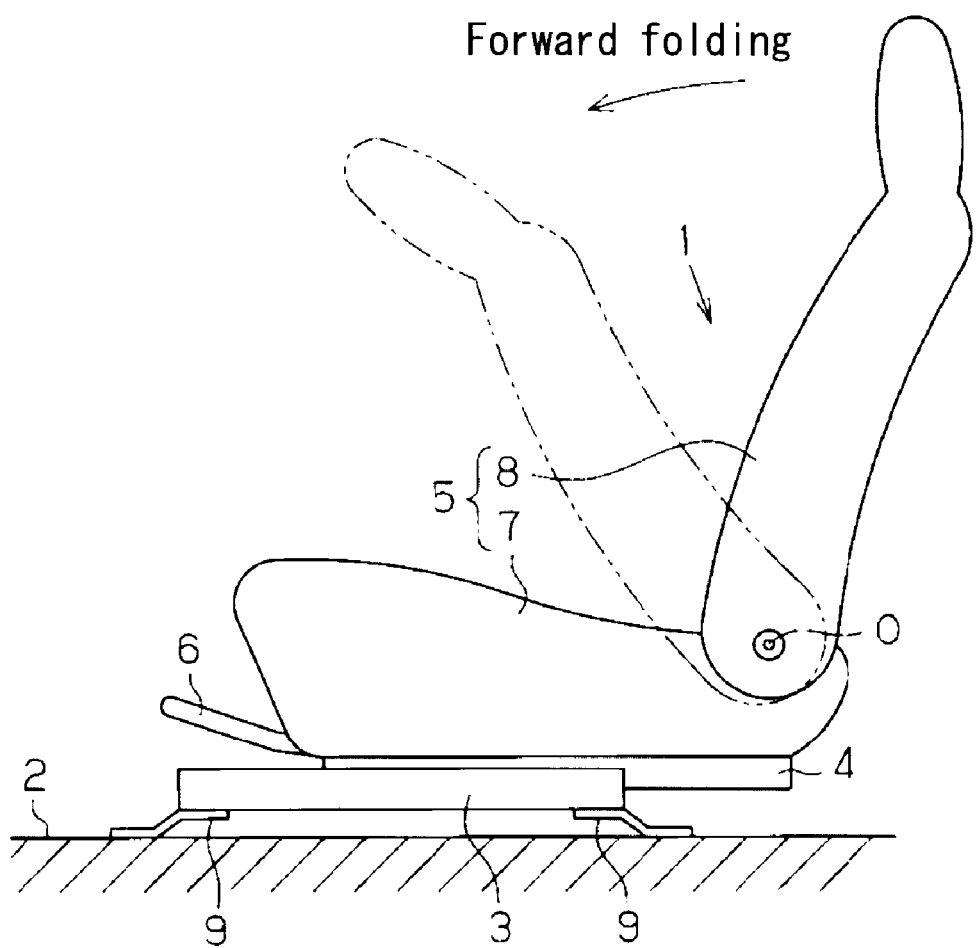
FIG. 13 is a side view of a seat for the vehicle according to the embodiment.

An embodiment will be explained with reference to the attached drawings. FIG. 13 is a side view schematically illustrating a seat for a vehicle (vehicle seat) 1 provided at a front seat side of a vehicle such as an automobile. In the embodiment, directions and orientations such as left, right, front, rear, top, and bottom correspond to those when viewed from a seat occupant seated on the vehicle seat 1. As illustrated in FIG. 13, a lower rail 3 serving as a first rail and extending in a longitudinal direction of the vehicle is fixed to a vehicle floor 2 via front and rear leg brackets 9. An upper rail 4 serving as a second rail is attached to the lower rail 3 so as to be movable relative thereto.

In the embodiment, one pair of the lower rail 3 and the upper rail 4 is provided at one side (i.e., a left side) of the vehicle seat 1 in the width direction while another pair of the lower rail 3 and the upper rail 4 is provided at the other side (i.e., a right side) of the vehicle seat 1. In FIG. 13, the lower rail 3 and the upper rail 4 arranged at the left side of the vehicle seat 1 are illustrated. A seat 5 is fixed and supported by the upper rails 4. The seat 5 includes a seat cushion 7 serving as a seating portion and a seat back 8 tiltably supported about a rotational axis O at a rear end of the seat cushion 7. A relative movement between the lower rail 3 and the upper rail 4 is basically restricted. A release handle 6 serving as an operation handle is provided to release the restricted state of the relative movement between the lower rail 3 and the upper rail 4.

Figure 1:
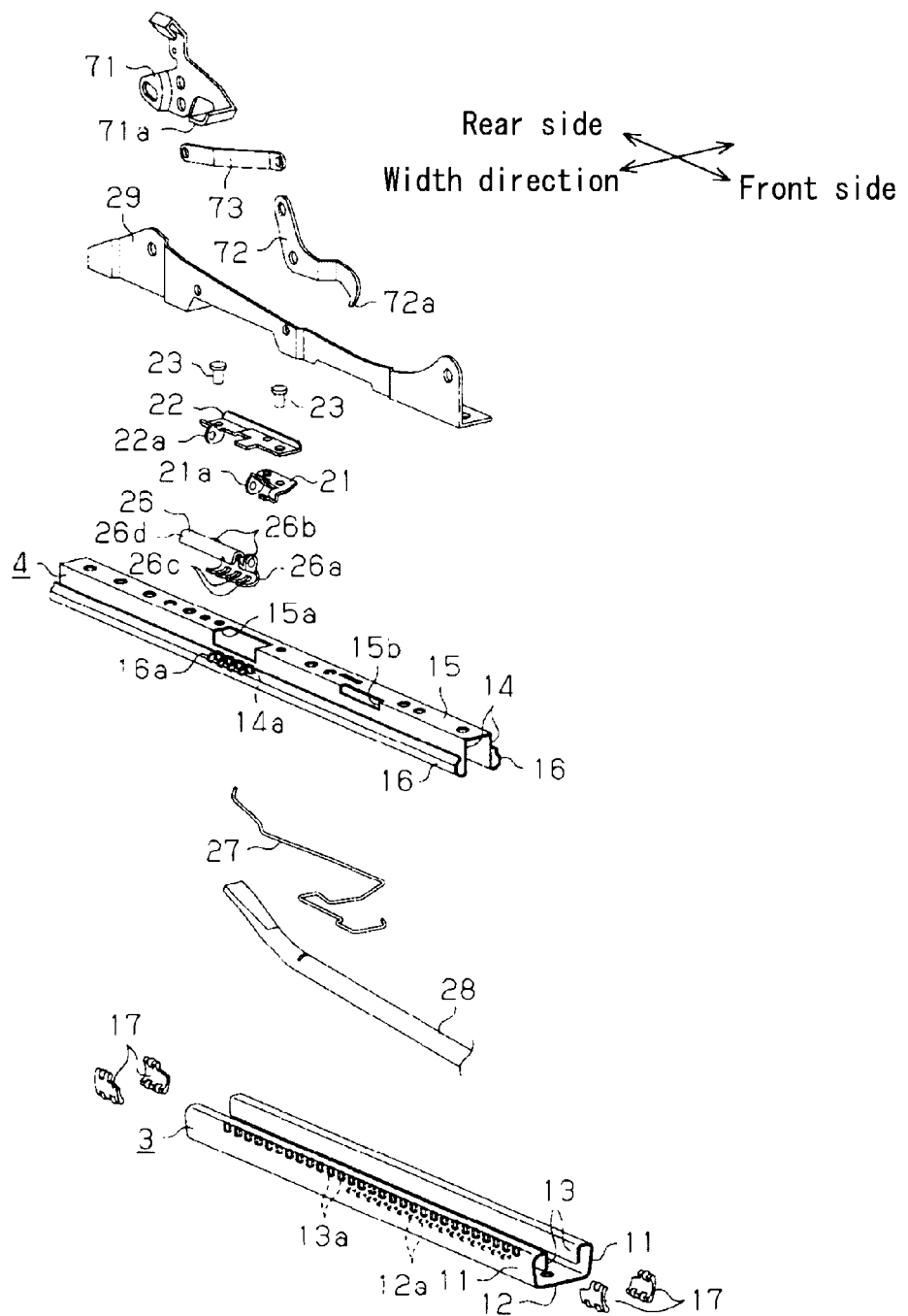
FIG. 1 is an exploded perspective view of a portion of a seat slide apparatus for a vehicle according to an embodiment disclosed here.
Figure 2:
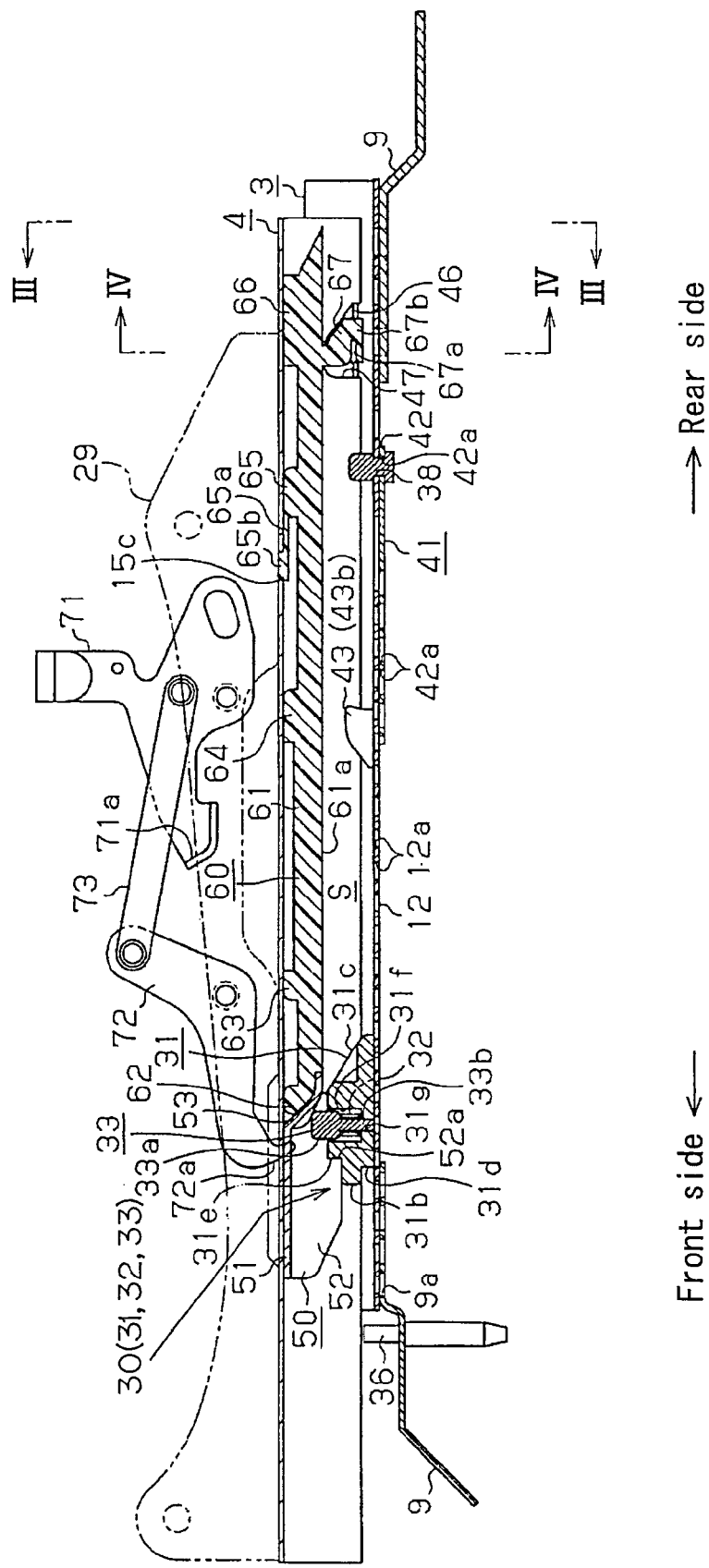
FIG. 2 is a longitudinal sectional view of the seat slide apparatus according to the embodiment.
Figure 3:
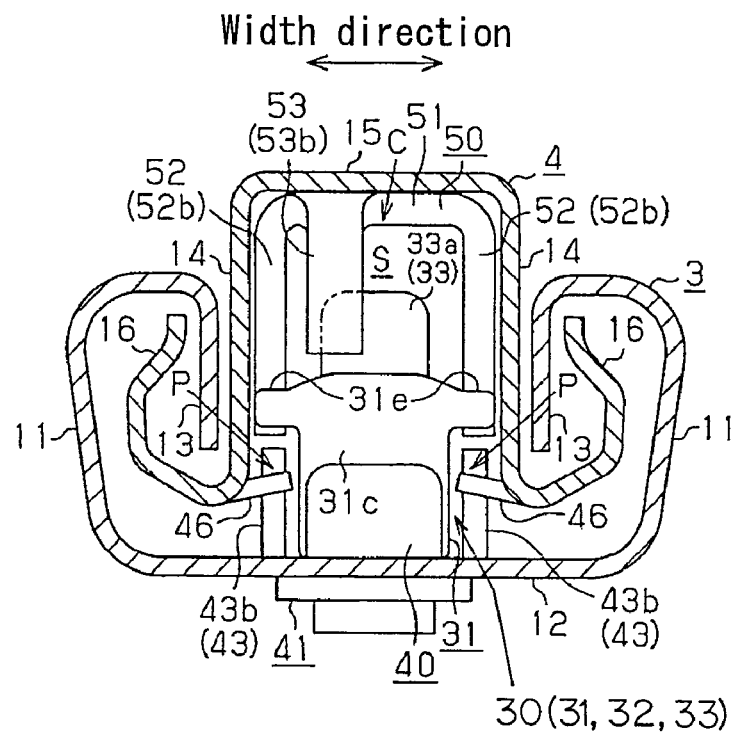
FIG. 3 is a cross sectional view taken along line III-III illustrated in FIG. 2.
Figure 4:
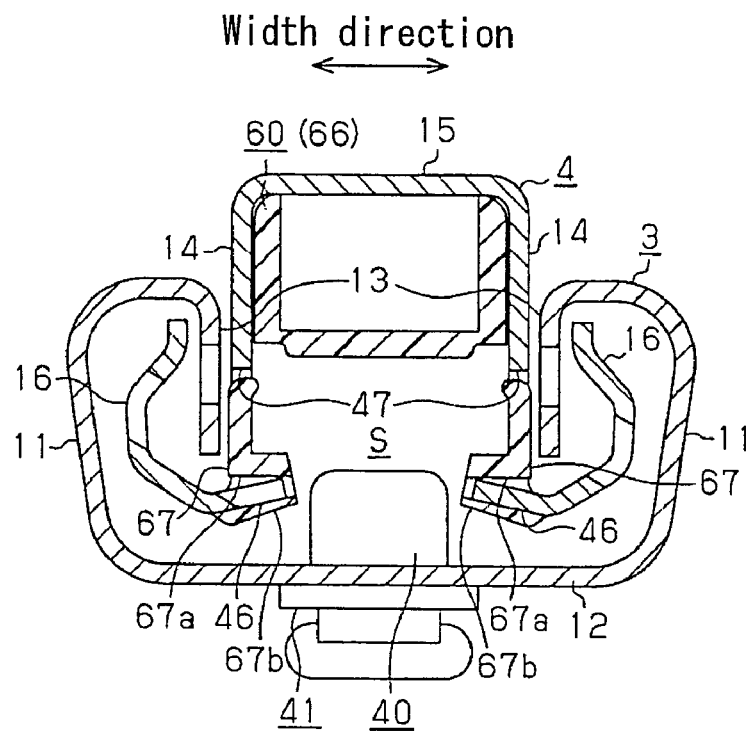
FIG. 4 is a cross sectional view taken along line IV-IV illustrated in FIG. 2.

A seat slide apparatus for a vehicle according to the embodiment will be explained with reference to FIGS. 1 to 4. In FIGS. 3 and 4, some components of the seat slide apparatus are omitted for convenience. As mentioned above, one pair of the lower rail 3 and the upper rail 4 is provided at one side of the vehicle seat 1 in the width direction while another pair of the lower rail 3 and the upper rail 4 is provided at the other side of the vehicle seat 1. Therefore, a structure including the lower rail 3 and the upper rail 4 provided at one side of the vehicle seat 1 in the width direction is substantially the same as a structure including the lower rail 3 and the upper rail 4 provided at the other side of the vehicle seat 1. In FIGS. 1 and 2, the structure including the lower rail 3 and the upper rail 4 provided at the right side of the vehicle seat 1 in the width direction is illustrated and an explanation thereof will be described below.

As illustrated in FIG. 1, the lower rail 3 includes a pair of side wall portions 11 and a bottom wall portion 12. Each of the side wall portions 11 extends in a substantially vertical direction of the vehicle from respective ends of the bottom wall portion 12 in the width direction. The side wall portions 11 are connected to each other by the bottom wall portion 12. As illustrated in FIG. 3, folding wall portions 13 are continuously formed at respective upper ends of the side wall portions 11 so as to bend inwardly in the width direction and then fold downwardly.

The upper rail 4 includes a pair of side wall portions 14 and a cover wall portion 15. Each of the side wall portions 14 extends in the substantially vertical direction of the vehicle between the folding wall portions 13 of the lower rail 3. The side wall portions 14 are connected to each other by the cover wall portion 15. As illustrated in FIG. 3, folding wall portions 16 are continuously formed at respective lower ends of the side wall portions 14 so as to bend outwardly in the width direction and then fold upwardly. Each of the folding wall portions 16 is arranged so as to be surrounded by the side wall portion 11 and the folding wall portion 13.

Accordingly, the lower rail 3 and the upper rail 4 are each formed substantially into a U-shape in a cross section (i.e., a rail cross section of each of the lower rail 3 and the upper rail 4 is formed into a U-shape) so that openings of the lower rail 3 and the upper rail 4 face each other. The lower rail 3 and the upper rail 4 are prevented from disengaging from each other in the vertical direction by an engagement between the folding wall portions 13 and 16. The rail cross section of each of the lower rail 3 and the upper rail 4 has a box shape (rectangular shape). As illustrated in FIG. 3, the lower rail 3 constitutes an inner void S together with the upper rail 4.

As illustrated in FIG. 1, the upper rail 4 is slidably supported relative to the lower rail 3 in the longitudinal direction of the vehicle by means of two pairs of rolling members 17. Specifically, two of the rolling members 17 are provided at a front end portion of the upper rail 4 while being disposed between the folding wall portions 16 and the facing side wall portions 11 respectively. In addition, two of the rolling members 17 are provided at a rear end portion of the upper rail 4 while being disposed between the folding wall portions 16 and the facing side wall portions 11 respectively.

Multiple circular engagement bores 12a are formed at respective intervals at the bottom wall portion 12 of the lower rail 3 in the longitudinal direction. In addition, multiple square lock bores 13a are formed at the respective intervals at one of the folding wall portions 13 of the lower rail 3 (i.e., the folding wall portion 13 illustrated on the left side in FIG. 1) in the longitudinal direction.

Multiple insertion bores 14a, specifically, four insertion bores 14a are formed at the respective intervals at one of the side wall portions 14 of the upper rail 4 (i.e., the side wall portion 14 illustrated on the left side in FIG. 1). The four insertion bores 14a are arranged in such a manner so as to face four of the multiple lock bores 13a arranged next to each other in the longitudinal direction and formed at the folding wall portion 13.

Further, multiple insertion bores 16a, specifically, four insertion bores 16a are formed at the respective intervals at one of the folding wall portions 16 of the upper rail 4 (which is illustrated on the left side in FIG. 1) in the longitudinal direction. The four insertion bores 16a are arranged in such a manner to face the four insertion bores 14a. A rectangular through hole 15a and a rectangular through bore 15b are formed at a shoulder portion defined between the cover wall portion 15 and one of the side wall portions 14 (which is illustrated on the left side in FIG. 1) of the upper rail 4. The through hole 15a is provided at substantially the same position as the insertion bores 14a, and the like, in the longitudinal direction. The through bore 15b is provided at a front side of the through hole 15a in the longitudinal direction.

A pair of support brackets 21 and 22 formed by a plate member, specifically, the front support bracket 21 and the rear support bracket 22, is tightened to an upper surface of the cover wall portion 15 of the upper rail 4 so as to face the through hole 15a. The front and rear support brackets 21 and 22 are tightened to the cover wall portion 15 by multiple rivets 23. Bearing pieces 21a and 22a are formed in a projecting manner at the front and rear support brackets 21 and 22 respectively so as to be positioned at front and rear ends of the through hole 15a. The bearing pieces 21a and 22a face each other in the longitudinal direction of the upper rail 4.

A lock lever 26 formed by a plate member and serving as a lock member is rotatably supported by the front and rear support brackets 21 and 22 via a lock lever pin that is inserted into the bearing pieces 21a and 22a. The lock lever 26 includes a body portion 26a having an elongated shape and a pair of support pieces 26b. The body portion 26a has a length shorter than a distance between the bearing pieces 21a and 22a. The support pieces 26b bend from respective ends of the body portion 26a. The lock lever 26 is rotatably supported by the front and rear support brackets 21 and 22 in a state where the lock lever pin penetrates through the bearing pieces 21a and 22a, and the support pieces 26b.

Multiple lock projections 26c, specifically, four lock projections 26c are formed at the respective intervals at the lock lever 26. The lock projections 26c extend downwardly from the body portion 26a and bend outwardly. The lock projections 26c are introduced to the rail cross section of the upper rail 4 through the through hole 15a. Each of the lock projections 26c is arranged so as to engage or disengage relative to the facing insertion bores 14a and 16a when rotating about the lock lever pin.

In a case where the lock projections 26c of the lock lever 26 are inserted into the lock bores 13a through the insertion bores 14a and 16a, the relative movement between the lower rail 3 and the upper rail 4 is restricted. Accordingly, the movement of the upper rail 4 relative to the lower rail 3 is restricted at the predetermined intervals within a range from a rearmost position, where one of the lock projections 26c of the lock lever 26 is inserted into the lock bore 13a arranged at a rearmost side, to a foremost position, where one of the lock projections 26c is inserted into the lock bore 13a arranged at a foremost side. As a result, the position of the seat 5 supported by the upper rails 4 is determined. On the other hand, the relative movement between the lower rail 3 and the upper rail 4 is allowed when the lock projections 26c of the lock lever 26 sequentially disengage from the insertion bores 16a and the lock bores 13a.

The lock lever 26 includes a contact piece 26d that extends upwardly from the body portion 26a. A bar-shaped lock spring 27, of which one end engages with the upper rail 4, engages with the contact piece 26d at the other end. The lock lever 26 is constantly rotatably biased by the lock spring 27 in a direction where the lock projections 26c are inserted into the insertion bores 14a, and the like. In a case where an operation force from the release handle 6 is transmitted to the lock lever 26 via a connection bar 28 that is connected to the release handle 6, the lock lever 26 rotates in a direction where the lock projections 26c are retracted against the biasing force of the lock spring 27, i.e., in a direction where the lock projections 26c disengage from the insertion bores 16a, and the like. As a result, the relative movement between the lower rail 3 and the upper rail 4 is permitted. For example, at a time of a normal slide operation for an adjustment of the seat position, the operation force is applied to the release handle 6 to thereby permit the relative movement between the lower rail 3 and the upper rail 4.

As illustrated in FIGS. 2 and 3, a memory piece 30 serving as a memory member is attached to the bottom wall portion 12 of the lower rail 3. The memory piece 30 includes a slider body 31, a coil spring 32, and a memory pin 33.

Figure 10A:
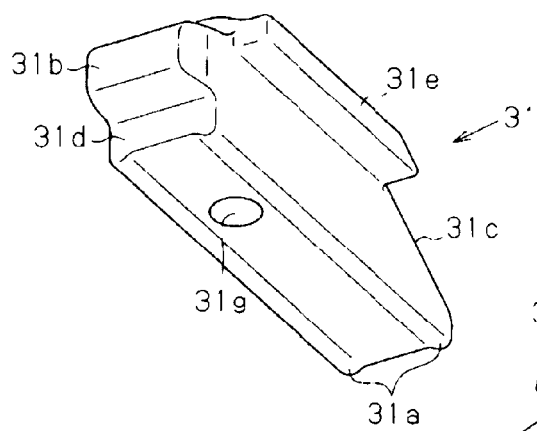
FIGS. 10A and 10B are perspective views each illustrating a slider body according to the embodiment.
Figure 10B:
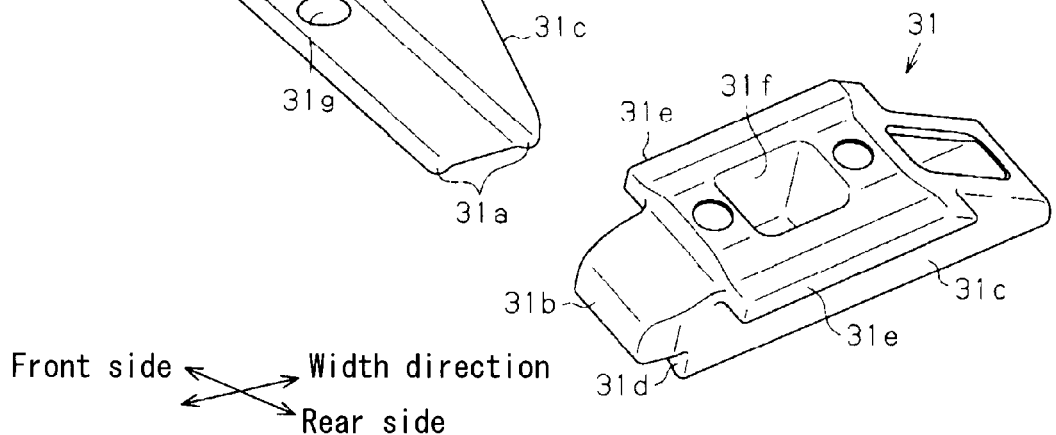

The slider body 31 is formed substantially into a block shape having a width smaller than a distance between the side wall portions 14 of the upper rail 4. As illustrated in FIGS. 10A and 10B, a pair of guide portions 31a is formed at a lower surface of the slider body 31 along a longitudinal direction so as to project downwardly. Specifically, the guide portions 31a are formed at both edges in a width direction on the lower surface of the slider body 31 while projecting in a rib shape. The slider body 31 is slidably supported by the bottom wall portion 12 of the lower rail 3 via the guide portions 31a so as not to interfere with the side wall portions 14 of the upper rail 4 within the inner void S. In addition, a projecting portion 31b is formed at a front end of the slider body 31 to project forward. Further, a rear contact portion 31c is formed at a rear end of the slider body 31 to project rearward in an inclined manner. The rear contact portion 31c inclines downward and rearward.

A front contact portion 31d is formed by a stepped surface between the lower surface and the projecting portion 31b of the slider body 31. A pair of contact portions 31e is formed between the projecting portion 31b and the rear contact portion 31c. Specifically, the contact portions 31e extend in opposite directions from each other, i.e., in both outer directions in the width direction from respective upper end portions of the slider body 31. Further, the slider body 31 includes a guide hole 31f having substantially a square shape and opening upwardly as illustrated in FIGS. 2 and 10B, and an insertion bore 31g penetrating through a bottom wall of the guide hole 31f and having an inner diameter substantially equal to an inner diameter of the engagement bore 12a formed at the bottom wall portion 12 of the lower rail 3.

As illustrated in FIG. 2, the coil spring 32 is accommodated within the guide hole 31f of the slider body 31. The memory pin 33 is mounted at the guide hole 31f while being inserted into the coil spring 32. The memory pin 33 includes a head portion 33a formed substantially into a square pole so as to mach an outer shape of the guide hole 31f and placed on the coil spring 32. The memory pin 33 also includes an engagement portion 33b having substantially a column shape and inserted into the coil spring 32 by projecting downwardly from the head portion 33a. An outer diameter of the engagement portion 33b is specified to be substantially equal to an inner diameter of the insertion bore 31g (and the engagement bore 12a).

The memory pin 33 is inserted into the coil spring 32 in a state where the engagement portion 33b is coaxially arranged with the insertion bore 31g. The memory pin 33 is biased upward by the coil spring 32 so that the head portion 33a projects upward from the slider body 31. At this time, the engagement portion 33b is configured so that an end (lower end) of the engagement portion 33b is prevented from penetrating through the insertion bore 31g. The memory piece 30 is movable in the longitudinal direction of the bottom wall portion 12 of the lower rail 3.

In a case where the memory pin 33 moves downward against the biasing force of the coil spring 32 in a state where the engagement bore 12a opens at a lower side of the engagement portion 33b, the lower end of the engagement portion 33b penetrates through the insertion bore 31g and the engagement bore 12a. At this time, the memory piece 30 is fixed to the bottom wall portion 12 of the lower rail 3 so as not to be movable in the longitudinal direction.

Figure 5A:
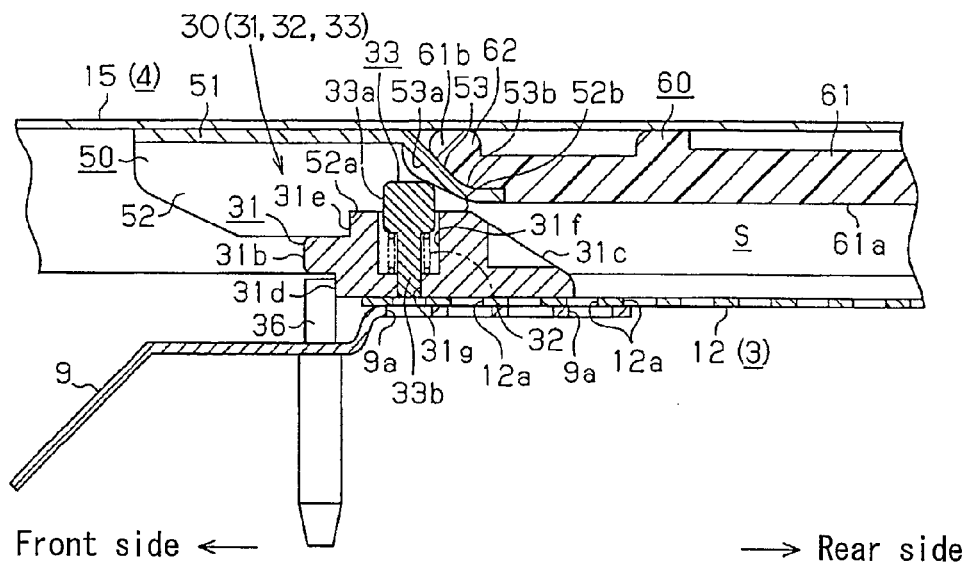
FIGS. 5A and 5B are longitudinal sectional views each illustrating an operation of the seat slide apparatus in a state where a memory piece is arranged at a foremost portion of a lower rail according to the embodiment.
Figure 5B:
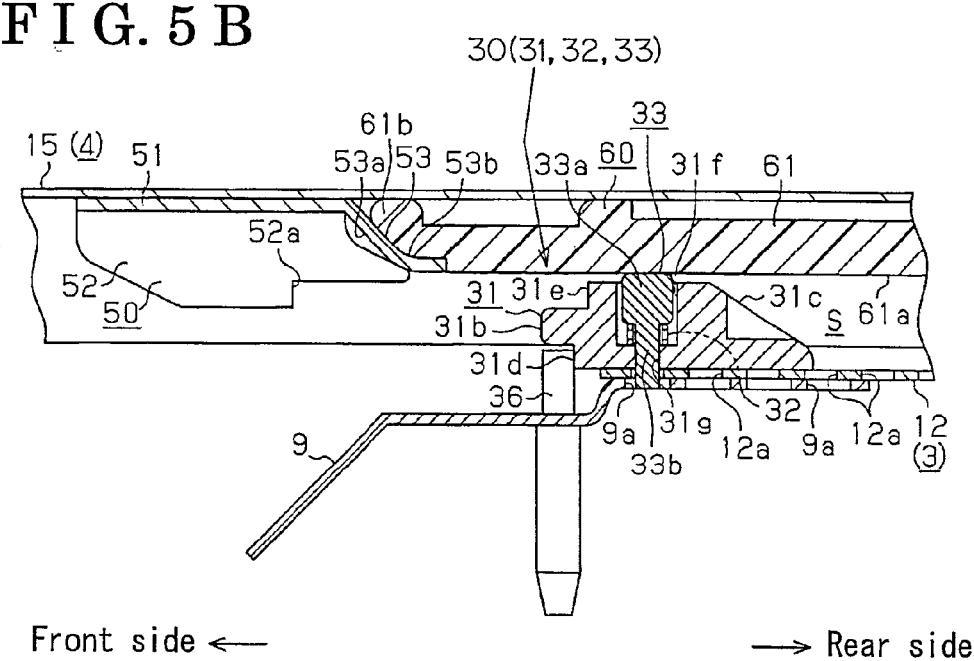

A front stopper pin 36, of which a center line extends in the vertical direction, is fixed to the front leg bracket 9. The front stopper pin 36 is arranged in a projecting manner so as not to block or interfere with a movement of the upper rail 4 in the longitudinal direction and so as to block or interfere with a movement of the slider body 31 of the memory piece 30 by contacting with the front contact portion 31d thereof. As illustrated in FIG. 5A, the forward movement of the memory piece 30 is stopped by the front contact portion 31d making contact with the front stopper pin 36. At this time, the memory piece 30 is positioned in such a manner that the engagement bore 12a of the lower rail 3 is arranged to open at the lower side of the engagement portion 33b. The front leg bracket 9, which is fixed to a front end portion of the lower surface of the lower rail 3 includes multiple circular insertion bores 9a that open towards the facing engagement bores 12a respectively. Accordingly, in a case where the memory pin 33 moves downward against the biasing force of the coil spring 32, the lower end of the engagement portion 33b penetrates through the insertion bore 31g, the engagement bore 12a, and the insertion bore 9a as illustrated in FIG. 5B, thereby prohibiting the memory piece 30 to move in the longitudinal direction of the lower rail 3.

Figure 9:
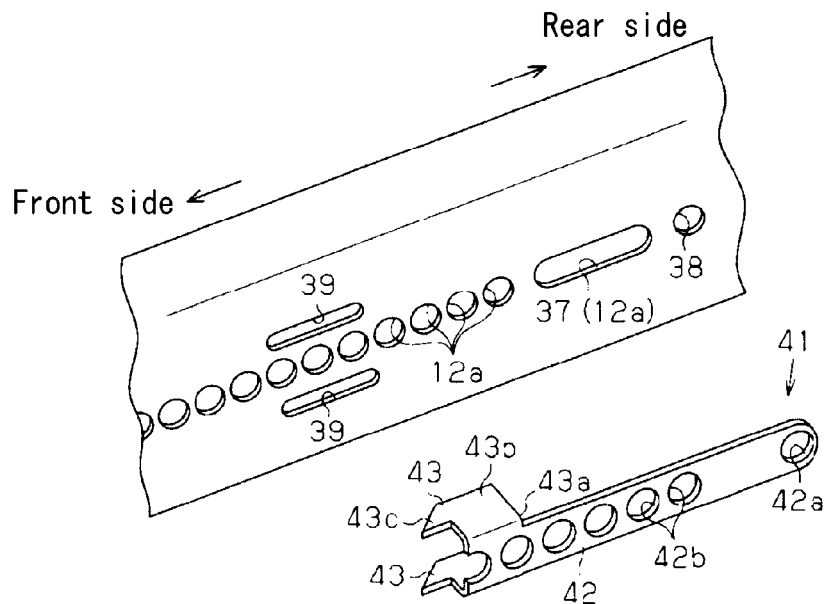
FIG. 9 is an exploded perspective view of the lower rail and a foremost stopper bracket according to the embodiment.

A foremost stopper bracket 41 serving as an auxiliary bracket and formed by a metallic plate is tightened to a rear portion of the bottom wall portion 12 of the lower rail 3 by a rearmost stopper pin 40 (see FIG. 6) serving as a tightening member. As illustrated in FIG. 9, a rear end engagement bore 37 that is one of the multiple engagement bores 12a formed at the bottom wall portion 12 of the lower rail 3 is arranged at a rearmost side among the engagement bores 12a. The rear end engagement bore 37 is an elongated bore that extends rearward from a point away from the adjacent engagement bore 12a, i.e., one of the engagement bores 12a arranged next to the rear end engagement bore 37, by the predetermined interval. A pin insertion bore 38 having substantially an oval shape is formed at a rear side of the rear end engagement bore 37. In addition, two stopper insertion bores 39 each serving as an insertion bore and having a slit shape are formed at a front side of the rear end engagement bore 37. The two stopper insertion bores 39 are arranged at respective sides of the engagement bores 12a in the width direction while extending in the longitudinal direction of the lower rail 3.

Figure 6:
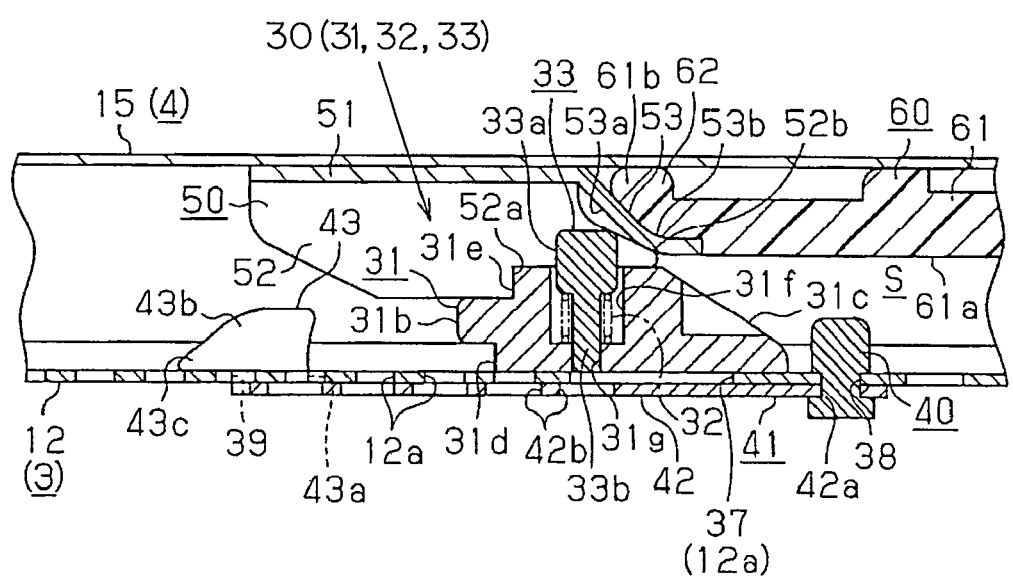
FIG. 6 is a longitudinal sectional view illustrating the operation of the seat slide apparatus in a state where the upper rail is arranged at a rearmost position according to the embodiment.

As illustrated in FIG. 9, the foremost stopper bracket 41 includes an attachment portion 42 having an elongated shape and extending in the longitudinal direction of the lower rail 3. The attachment portion 42 is in contact with a lower surface (i.e., an outer surface) of the bottom wall portion 12. The attachment portion 42 includes a circular-shaped insertion bore 42a that opens towards the pin insertion bore 38. As illustrated in FIG. 6, the attachment portion 42 of the foremost stopper bracket 41 is tightened to the bottom wall portion 12 by a riveting of the rearmost stopper pin 40 that is inserted into the pin insertion bore 38 and the insertion bore 42a at the rear side of the memory piece 30. Multiple circular-shaped insertion bores 42b are formed at the predetermined intervals at the attachment portion 42 so as to face and open towards the engagement bores 12a including the rear end engagement bore 37. Accordingly, a portion of the rear end engagement bore 37a elongated rearwards from the point away from the adjacent engagement bore 12a by the predetermined interval is covered by the attachment portion 42 so that the rear end engagement bore 37 opens to form substantially into a circular shape that matches an outer shape of the insertion bore 42b.

The foremost stopper bracket 41 includes two flanges 43 at the front side of the attachment portion 42. Specifically, the flanges 43 extend upwardly from respective ends of the attachment portion 42 in the width direction so as to penetrate through the respective stopper insertion bores 39. Each of the flanges 43 includes an insertion piece 43a and a flange portion 43b. The insertion piece 43a is inserted into the stopper insertion bore 39 while having a length shorter than a length of the stopper insertion bore 39 in the longitudinal direction. The flange portion 43b is formed to be connected to an end of the insertion piece 43a that is inserted into the inner void S so as to extend in the vertical direction. The flange portion 43b has a length slightly shorter than the length of the stopper insertion bore 39 and longer than a length of the insertion piece 43a in the longitudinal direction. Specifically, the flange portion 43b has substantially a fin shape so that a lower side of a front end protrudes relative to an upper side of the front end. The flange portion 43b includes a hook portion 43c protruding forward relative to the insertion piece 43a at the upper side of the bottom wall portion 12. Thus, a lower end of the hook portion 43c is in contact with an upper surface (i.e., an inner surface)) of the bottom wall portion 12 of the lower rail 3.

As illustrated in FIGS. 3 and 6, the rearmost stopper pin 40 is arranged in a projecting manner so as not to block or interfere with the movement of the upper rail 4 in the longitudinal direction and so as to block or interfere with the movement of the slider body 31 of the memory piece 30 by contacting with the rear contact portion 31c thereof. In addition, each of the flanges 43 of the foremost stopper bracket 41 is arranged in a projecting manner so as not to block the movement of the slider body 31. That is, a space formed below each of the contact portions 31e of the slider body 31 constitutes a passage P by which an interference between the slider body 31 and the flange 43 is avoidable. In a case where the memory piece 30 moves rearward in the longitudinal direction of the lower rail 3, the rear contact portion 31c that passes through the flanges 43 makes contact with the rearmost stopper pin 40, thereby stopping the movement of the memory piece 30. At this time, the rear end engagement bore 37 is arranged so as to open in the substantially circular shape while being covered by the attachment portion 42 below the engagement portion 33b of the memory piece 30 (see FIG. 6). Therefore, when the memory pin 33 moves downward against the biasing force of the coil spring 32, the lower end of the engagement portion 33b penetrates through the insertion bore 31g, the rear end engagement bore 37, and the insertion bore 42b. As a result, the memory piece 30 is prevented from moving in the longitudinal direction of the lower rail 3.

As illustrated in FIGS. 2 and 4, a pair of cut and lift pieces 46 serving as a pair of rail-side foremost stopper portions is formed at a rear end portion of the upper rail 4 and at a rear side of the flanges 43. The pair of cut and lift pieces 46 is arranged in a symmetrical manner in the width direction.

Specifically, each of the cut and lift pieces 46 is formed at the lower end of the side wall portion 14 connected to the folding wall portion 16. The cut and lift pieces 46 are each cut and bent upward at a predetermined angle so that a distance between upper ends of the cut and lift pieces 46 is shorter than a distance between lower ends thereof to form into straight inclined shapes. The cut and lift pieces 46 protrude within the inner void S. In addition, the cut and lift pieces 46 extend in a direction where the lower rail 3 and the upper rail 4 move relative to each other. Because of the cut and lift pieces 46, cutout portions 47 are defined at the respective lower ends of the side wall portions 14 so as to open in the width direction. The cutout portions 47 are externally covered in the width direction by at least the respective folding wall portions 16.

Figure 7:
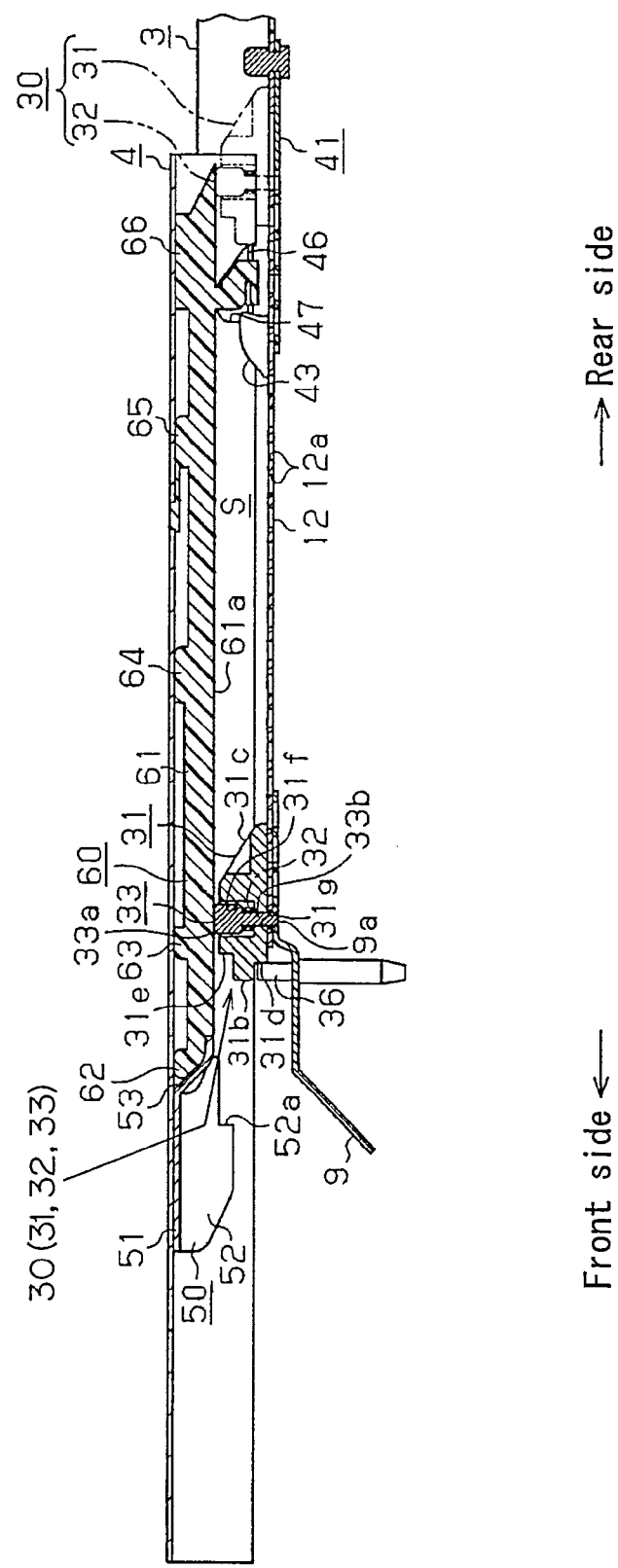
FIG. 7 is a longitudinal sectional view illustrating the operation of the seat slide apparatus in a state where the upper rail is arranged at a foremost position according to the embodiment.

As illustrated in FIG. 3, the rearmost stopper pin 40 is arranged between the cut and lift pieces 46 in the width direction. The cut and lift pieces 46 are formed in a projecting manner so that the movement of the cut and lift pieces 46 in the longitudinal direction is not blocked by the rearmost stopper pin 40 and the memory piece 30, and is blocked by the flange portions 43b of the flanges 43. Thus, as illustrated in FIG. 7, the flanges 43 and the cut and lift pieces 46 restrict a relative movement range between the lower rail 3 and the upper rail 4 by contacting and engaging in association with the relative movement between the lower rail 3 and the upper rail 4. That is, the forward movement of the upper rail 4 relative to the lower rail 3 is restricted to a point where the flanges 43 make contact with the cut and lift pieces 46.

Figure 11:
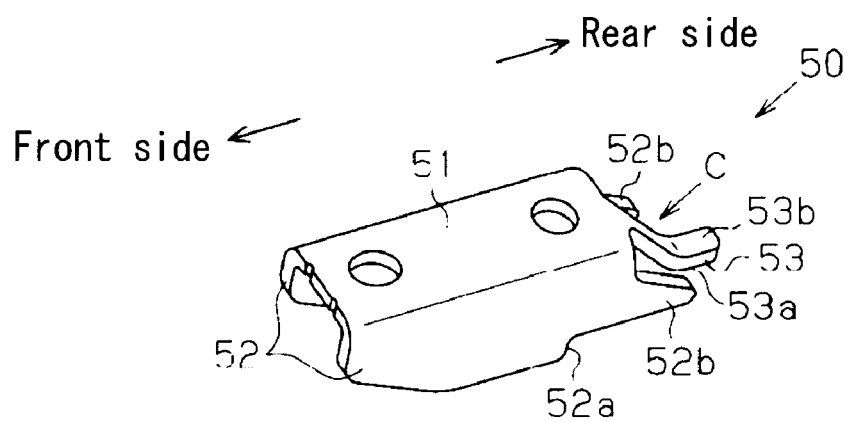
FIG. 11 is a perspective view of a front stopper bracket according to the embodiment.

As illustrated in FIG. 2, a front stopper bracket 50 is fixed to a front edge portion of the upper rail 4. Specifically, the front stopper bracket 50 is provided at a front side of the memory piece 30. As illustrated in FIG. 11, the front stopper bracket 50 includes a fitting wall portion 51 in contact with a lower surface (i.e., an inner surface) of the cover wall portion 15, and a pair of engagement wall portions 52 that extend downwardly from respective ends of the fitting wall portion 51 in the width direction, thereby forming into a substantially U-shape opening downwardly. The front stopper bracket 50 is fixed to the upper rail 4 in a state where the fitting wall portion 51 is tightened to the cover wall portion 15 by a riveting pin, or the like.

As illustrated in FIGS. 2 and 3, the engagement wall portions 52 of the front stopper bracket 50 are arranged in a projecting manner so that the forward movement of the engagement wall portions 52 are not interfered by the front stopper pin 36 and the flange portions 43b of the flanges 43 and so that the rearward movement of the engagement wall portions 52 are interfered by the contact portions 31e of the memory piece 30. As illustrated in FIGS. 2 and 11, a stepped surface formed at each of the engagement wall portions 52 may make contact with the contact portion 31e of the memory piece 30 to thereby constitute a front holding portion 52a. Accordingly, the rearward movement of the upper rail 4 relative to the lower rail 3 is restricted to a point where the front holding portions 52a of the engagement wall portions 52 make contact with the contact portions 31e of the memory piece 30 fixed to the lower rail 3. Alternatively, as illustrated in FIG. 6, the rearward movement of the upper rail 4 relative to the lower rail 3 is restricted to a point where the front holding portions 52a of the engagement wall portions 52 make contact with the contact portions 31e of the memory piece 30 of which the rear contact portion 31c makes contact with the rearmost stopper pin 40. A rear end portion of each of the engagement wall portions 52 forms a projecting wall portion 52b that inclines downwardly as illustrated in FIG. 11.

Figure 8A:
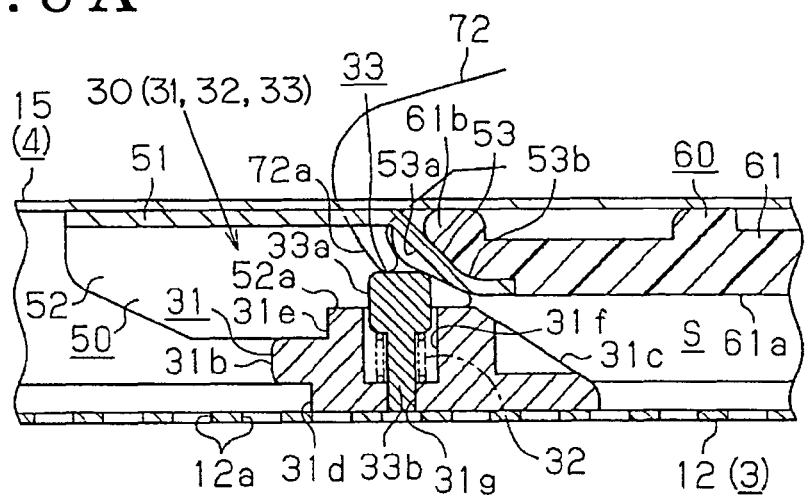
FIGS. 8A and 8B are cross sectional views each illustrating the operation of the seat slide apparatus according to the embodiment.

As illustrated in FIGS. 2 and 11, the front stopper bracket 50 also includes a rear holding portion 53 having a hook shape and projecting rearward from a rear end of the fitting wall portion 51. More specifically, the rear holding portion 53 projects at a portion of the rear end of the fitting wall portion 51 between the engagement wall portions 52 in the width direction. The front stopper bracket 50 integrally includes the fitting wall portion 51, the engagement wall portions 52, and the rear holding portion 53. The rear holding portion 53, which inclines downwardly, forms an inclination surface 53a by a lower surface and an engagement portion 53b by an upper surface that is an opposite surface of the lower surface as illustrated in FIG. 8A. The engagement portion 53b inclines in the same manner as the inclination surface 53a. The rear holding portion 53 is arranged at the rear end between the engagement wall portions 52 at the portion close to one side in the width direction (i.e., a left side in FIG. 3). The rear holding portion 53 is arranged in a projecting manner so that the longitudinal movement of the rear holding portion 53 is prevented from being interfered by the slider body 31 and the flange portions 43b of the flanges 43 and so that the longitudinal movement of the rear holding portion 53 is interfered by a portion of the head portion 33a, which is positioned at one side in the width direction, of the memory pin 33 that projects upwardly from the slider body 31. As illustrated in FIG. 8A, in a state where the front holding portions 52a are in contact with the contact portions 31e, the inclination surface 53a of the rear holding portion 53 makes contact with a rear end surface of the head portion 33a of the memory pin 33 that projects upwardly from the slider body 31, thereby holding and supporting the memory piece 30.

Figure 8B:
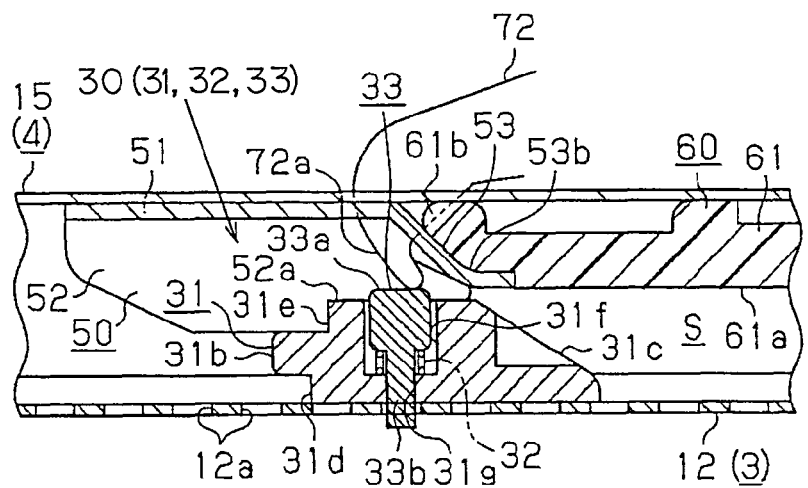

Accordingly, in a case where the upper rail 4 moves forward relative to the lower rail 3, the memory piece 30 also moves forward together with the upper rail 4 because the memory pin 33, which projects upward from the slider body 31, is pressed by the rear holding portion 53 of the front stopper bracket 50. Alternatively, as illustrated in FIG. 8B, in a case where the memory pin 33 is retracted within the slider body 31 so as to engage with the lower rail 3, the memory pin 33 does not block the movement of the rear holding portion 53 of the front stopper bracket 50 to thereby allow the forward movement of the upper rail 4 while the memory pin 33 remains at a position to be fixed to the lower rail 3. That is, in a case where the upper rail 4 moves forward relative to the lower rail 3, the front stopper bracket 50 is disengageable from the memory piece 30 as long as the memory pin 33 is retracted and positioned within the slider body 31. As illustrated in FIG. 3, a clearance C is defined between the rear holding portion 53, which is arranged at the portion close to the one side in the width direction, and the adjacent projecting wall portion 52b arranged at the other side in the width direction (i.e., a right side in FIG. 3). The clearance C is arranged in the longitudinal direction so as to match a position of the through bore 15b of the upper rail 4.

As illustrated in FIG. 2, a memory holding bracket 60 made of a resin material or an elastic material, for example, is fixed within the upper rail 4 while being adjacent to the front stopper bracket 50 at a rear side thereof. The memory holding bracket 60 constitutes a holding member together with the front stopper bracket 50. The memory holding bracket 60 includes a body holding portion 61 having an elongated shape extending in the longitudinal direction of the upper rail 4. A lower surface of the body holding portion 61 forms a pressing surface 61a that extends evenly.

The memory holding bracket 60 includes multiple guide portions 62, 63, 64, 65, and 66 having intervals from one another in the longitudinal direction and extending upward from an upper end of the body holding portion 61. The guide portions 62 to 65 each project upward in a table shape or a flange shape. The guide portion 66 having a block shape projects upward at a rear side of the guide portion 65. The memory holding bracket 60 is formed in such a manner that the pressing surface 61a extends in parallel to the bottom wall portion 12 of the lower rail 3 in a state where upper surfaces of the guide portions 62 to 66 are in contact with the lower surface of the cover wall portion 15 of the upper rail 4.

As illustrated in FIGS. 8A and 8B, a front edge portion of the body holding portion 61 of the memory holding bracket 60 forms a sharp support portion 61b. A lower surface of the support portion 61b is cut so as to conform to a sharp corner portion defined between the lower surface of the cover wall portion 15 of the upper rail 4 and the engagement portion 53b of the front stopper bracket 50. Accordingly, the memory holding bracket 60 is inserted into the upper rail 4 from the rear side thereof to the forward direction while the upper surfaces of the guide portions 62 to 66 are slidably in contact with the lower surface of the cover wall portion 15 of the upper rail 4. As a result, the support portion 61b is inserted into the aforementioned corner portion to thereby support the front edge portion of the memory holding bracket 60. At this time, the pressing surface 61a is defined in such a manner to be connected in a coplanar manner to a rear end of the inclination surface 53a. As illustrated in FIG. 2, a rear end of the pressing surface 61a of the body holding portion 61 is positioned to substantially match a rear end of the upper rail 4.

In addition, as illustrated in FIG. 2, the guide portion 65 substantially arranged at an intermediate portion of the body holding portion 61 in the longitudinal direction includes a projection 65a supported in a cantilever manner and projecting forward while an upper surface of the projection 65a is formed in a coplanar manner. The guide portion 65 also includes a fitting portion 65b having a disc shape and projecting upward from an end portion of the projection 65a. The fitting portion 65b engages with a circular-shaped fitting bore 15c formed at the cover wall portion 15 of the upper rail 4 in a case where the front edge portion of the memory holding bracket 60 is supported in the aforementioned manner. Thus, at a time when the memory holding bracket 60 is being inserted into the upper rail 4 in the aforementioned manner, the fitting portion 65b makes contact with the lower surface of the cover wall portion 15 to thereby elastically deform the projection 65a. As a result, the projection 65a moves in the longitudinal direction of the upper rail 4 while a front end of the projection 65a is separated from the cover wall portion 15. Then, when the fitting portion 65b reaches the fitting bore 15c so as to engage therewith, the projection 65a is elastically returned to make contact with the lower surface of the cover wall portion 15. The memory holding bracket 60 is prevented from being dislocated relative to the upper rail 4 in the longitudinal direction accordingly.

The guide portion 66 arranged at a rearmost portion of the body holding portion 61 is formed so as to conform to a shape of inner wall surfaces of the side wall portions 14 and the cover wall portion 15 of the upper rail 4, thereby being fitted to the upper rail 4. Thus, the position of the memory holding bracket 60 relative to the upper rail 4 is determined in the width direction.

Figure 12:
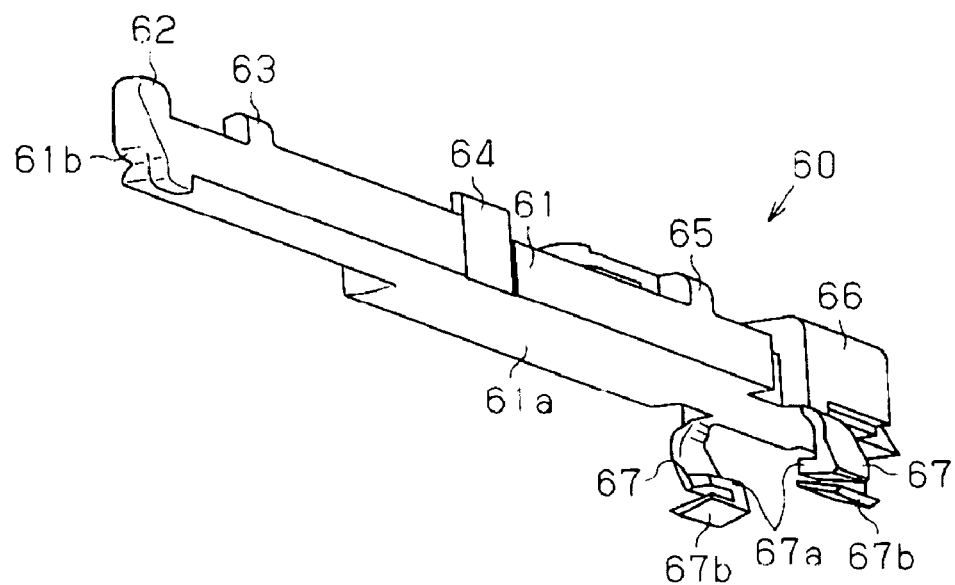
FIG. 12 is a perspective view of a memory holding bracket according to the embodiment.

Further, the memory holding bracket 60 includes a pair of fitting projections 67 at a rear edge portion where the guide portion 66 is arranged. The fitting projections 67 project towards respective outer sides in the width direction. As illustrated in FIG. 12, the fitting projections 67 extend downwardly from respective ends of a lower surface of the memory holding bracket 60 in the width direction and then bend inwardly in the width direction so as to form substantially into an L-shape. As illustrated in FIG. 4, a distance between the fitting projections 67 in the width direction is specified to be slightly larger than a distance between the side wall portions 14 in the width direction and is specified to be smaller than a distance between the folding wall portions 13 of the lower rail 3 in the width direction. The fitting projections 67 are fitted to the cutout portions 47 of the upper rail 4 in a case where the front edge portion of the memory holding bracket 60, i.e., the support portion 61b, is supported in the aforementioned manner. Accordingly, at the time when the memory holding bracket 60 is being inserted into the upper rail 4 in the aforementioned manner, the fitting projections 67 move in the longitudinal direction of the upper rail 4 while being pressed by respective inner side surfaces of the side wall portions 14 so as to be elastically deformed at respective upper ends towards the inner side in the width direction. Then, when the fitting projections 67 reach the respective cutout portions 47 and elastically return to be inserted thereto, the fitting projections 67 fitted to the respective cutout portions 47 are prevented from moving relative to the upper rail 4 in the longitudinal direction. The fitting projections 67 fitted to the cutout portions 47 are arranged at respective lower end portions of the upper rail 4 covered by the folding wall portions 16, thereby preventing an outward exposure of the fitting projections 67.

Lower ends of the fitting projections 67 that inwardly extend in the width direction form placing portions 67a that are placed on the cut and lift pieces 46. Therefore, the memory holding bracket 60 is positioned relative to the upper rail 4 in the vertical direction while the upper surfaces of the guide portions 62 to 66 are in contact with the lower surface of the cover wall portion 15 and the placing portions 67a are placed on the cut and lift pieces 46. In addition, each of the fitting projections 67 includes a cover portion 67b having substantially an L-shape, extending downward from a rear end of the placing portion 67a so as to cover a rear end surface of the cut and lift piece 46 and then extending forward so as to cover a lower surface of the cut and lift piece 46. Accordingly, the cut and lift pieces 46 are prevented from being exposed outside by being covered from a rear side by the cover portions 67b in addition to the placing portions 67a.

In FIG. 8A, the memory piece 30 makes contact at the contact portions 31e with the front holding portions 52a and at the rear end surface of the memory pin 33, which projects upward from the slider body 31, with the inclination surface 53a, i.e., the memory piece 30 is held by the front stopper bracket 50. At this time, during the normal slide operation in which the relative movement between the lower rail 3 and the upper rail 4 is allowed by an operation force applied to the release handle 6, the memory piece 30 moves in the longitudinal direction of the lower rail 3 in association with the movement of the upper rail 4.

As illustrated in FIG. 5A, in a case where the front contact portion 31d of the memory piece 30 engages with the front stopper pin 36 so that the further forward movement of the memory piece 30 is restricted, the rear end surface of the memory pin 33 is pressed by the inclination surface 53a in association with the further forward movement of the upper rail 4. Then, the memory pin 33 moves downward against the biasing force of the coil spring 32 in a state to be guided by the inclination surface 53a. The lower end of the engagement portion 33b penetrates through the insertion bore 31g, the engagement bore 12a, and the insertion bore 9a. Accordingly, the memory piece 30 is fixed to the bottom wall portion 12 of the lower rail 3 so as to be unmovable.

Next, when the upper rail 4 moves further forward, the inclination surface 53a guides the memory pin 33 to the pressing surface 61a of the memory holding bracket 60 that is continuously arranged in the rear of the inclination surface 53a. At this time, the head portion 33a of the memory pin 33 is pressed by the pressing surface 61a so that the state where the lower end of the engagement portion 33b is positioned within the insertion bore 31g, the engagement bore 12a and the insertion bore 9a is maintained. Thus, the memory piece 30 is maintained in a state to be fixed to the lower rail 3. That is, the further forward movement of the upper rail 4 is available while the memory piece 30 is fixed to the lower rail 3. The movement of the upper rail 4 to the foremost position as illustrated in FIGS. 5B and 7 is ensured. The relative movement of the upper rail 4 to the lower rail 3 is restricted at the predetermined intervals to the foremost position by the lock lever 26. The position of the seat 5 supported by the upper rail 4 in the longitudinal direction is adjustable relative to the vehicle floor 2 accordingly.

Afterwards, when the upper rail 4 moves rearward, the front holding portions 52a of the front stopper bracket 50 make contact with the respective contact portions 31e of the memory piece 30 that is fixed to the lower rail 3, thereby once stopping the movement of the front stopper bracket 50. At this time, the upper surface of the head portion 33a is released from the pressing surface 61a of the memory holding bracket 60 and the inclination surface 53a sequentially. As a result, the memory pin 33 moves upward by receiving the biasing force of the coil spring 32, thereby disengaging the lower end of the engagement portion 33b from the insertion bore 9a and the engagement bore 12a. The memory piece 30 is held by the front stopper bracket 50 in a state to be sandwiched between the front holding portions 52a and the inclination surface 53a.

In a case where the upper rail 4 is arranged in an arbitrary position within a range from an intermediate position (i.e., a foremost position of the memory piece 30) as illustrated in FIG. 5A to a rearmost position as illustrated in FIG. 6 so that the movement of the upper rail 4 relative to the lower rail 3 is adjustable and restricted by the lock lever 26, the memory piece 30 held by the front stopper bracket 50 is arranged so that that the engagement bore 12a opens below the memory pin 33. That is, the memory piece 30 can be fixed to the lower rail 3 in the aforementioned manner at an arbitrary position, where the movement of the upper rail 4 relative to the lower rail 3 is restricted by the lock lever 26, within a range until the forward movement of the upper rail 4 is restricted by the front stopper pin 36.

As illustrated in FIGS. 1 and 2, a support bracket 29 is tightened to the upper surface of the cover wall portion 15 of the upper rail 4. The support bracket 29 is formed by a plate member bending to form into an L-shape. The support bracket 29 extends in the longitudinal direction of the upper rail 4. A release lever 71 having substantially a V-shape and formed by a plate member is rotatably connected to a rear end portion of the support bracket 29. The release lever 71 includes a contact piece 71a at a front end bending in the width direction. The contact piece 26d of the lock lever 26 is arranged on a rotation locus of the contact piece 71a. The release lever 71 is constantly biased by a biasing means in a direction where the contact piece 71a is away from the contact piece 26d (i.e., in a clockwise direction in FIG. 2). The release lever 71 rotates about a rotational axis thereof in a counterclockwise direction in FIG. 2 in association with a forward folding operation of the seat back 8, thereby pressing the contact piece 26d of the lock lever 26 by the contact piece 71a. The restriction of the relative movement between the lower rail 3 and the upper rail 4 by the lock lever 26 is released accordingly.

A memory operation lever 72 having a claw shape and formed by a plate member is rotatably connected to substantially an intermediate portion of the support bracket 29 in the longitudinal direction. An end portion of a connection lever 73, of which another end portion is rotatably connected to the release lever 71, is rotatably connected to the memory operation lever 72. The connection lever 73 is formed by a plate member while having a bar shape. The memory operation lever 72 rotates about a rotational axis thereof in a counterclockwise direction in FIG. 2 in association with the rotation of the release lever 71 that is operated in response to the forward folding operation of the seat back 8.

The memory operation lever 72 includes a sharp pressing piece 72a at a front end. The pressing piece 72a is configured in such a manner that the through bore 15b of the upper rail 4 and the clearance C of the front stopper bracket 50 are arranged on a rotation locus of the pressing piece 72a. In a normal state of the seat 5, i.e., in a state where the seat back 8 is not folded forward and the memory piece 30 is held by the front stopper bracket 50, the head portion 33a is prevented from being pressed by the pressing piece 72a of the memory operation lever 72.

In the aforementioned state, when the memory operation lever 72 rotates in the counterclockwise direction in FIG. 2 in association with the forward folding operation of the seat back 8, the head portion 33a is pressed by the pressing piece 72a so that the memory pin 33 moves downward against the biasing force of the coil spring 32 as illustrated in FIG. 8B. Then, the memory piece 30 is fixed to the bottom wall portion 12 of the lower rail 3 and is unmovable relative thereto. At this time, when the contact piece 71a of the release lever 71 presses the contact piece 26d of the lock lever 26, the restriction of the relative movement between the lower rail 3 and the upper rail 4 by the lock lever 26 is released.

Afterwards, in a case where the upper rail 4 moves forward, the inclination surface 53a of the rear holding portion 53 guides the memory pin 33 to the pressing surface 61a of the memory holding bracket 60 connected to the rear side of the inclination surface 53a while restricting the upward movement of the memory pin 33, which has moved downward by being pressed by the pressing piece 72a. Accordingly, the memory piece 30 is maintained to be fixed to the lower rail 3, and the upper rail 4 moves further forward while the memory piece 30 remains to be fixed to the lower rail 3.

As long as the upper rail 4 is arranged in an arbitrary position where the relative movement of the upper rail 4 to the lower rail 3 is restricted by the lock lever 26 within the range from the intermediate position illustrated in FIG. 5A to the rearmost position illustrated in FIG. 6, the memory piece 30 held by the front stopper bracket 50 is fixed to the bottom wall portion 12 of the lower rail 3 in association with the forward folding operation of the seat back 8.

Then, in a case where the upper rail 4 moves rearward after the forward movement while the memory piece 30 remains to be fixed to the lower rail 3, the front holding portions 52a of the front stopper bracket 50 make contact with the contact portions 31e of the memory piece 30 that is fixed to the lower rail 3, thereby once stopping the movement of the front stopper bracket 50. Accordingly, the upper rail 4 returns to a previous position prior to the forward movement, i.e., returns to a memory position. Afterwards, when the seat back 8 is pulled back, the contact piece 26d of the lock lever 26 disengages from the contact piece 71a of the release lever 71 so that the relative movement between the lower rail 3 and the upper rail 4 is restricted at the memory position.

A so-called walk-in operation where the lock lever 26 is released and locked in association with the forward folding operation of the seat back 8 will be explained below. In a case where the seat back 8 is folded forward in a state where the relative movement of the upper rail 4 to the lower rail 3 is locked or restricted at a predetermined position (i.e., the memory position) as illustrated in FIG. 2, the release lever 71 and the memory operation lever 72 then rotate in the counterclockwise direction as illustrated in FIG. 8B. At this time, the contact piece 71a of the release lever 71 presses the contact piece 26d of the lock lever 26 to thereby release the restriction of the relative movement between the lower rail 3 and the upper rail 4 by the lock lever 26. At the same time, the pressing piece 72a of the memory operation lever 72 presses the head portion 33a of the memory pin 33 of the memory piece 30 to thereby fix the memory piece 30 to the bottom wall portion 12 of the lower rail 3.

In the aforementioned state, when the upper rail 4 moves forward, the inclination surface 53a of the rear holding portion 53 guides the memory pin 33 to the pressing surface 61a of the memory holding bracket 60 connected to the rear side of the inclination surface 53a while restricting the upward movement of the memory pin 33 that moves downward while being pressed by the pressing piece 72a. Thus, the upper surface of the head portion 33a is continuously pressed down by the pressing surface 61a so that the memory piece 30 is fixed to the lower rail 3. As mentioned above, the memory holding bracket 60, specifically, the pressing surface 61a extends to the rear end portion of the upper rail 4. Therefore, as illustrated by an imaginary line in FIG. 7, the aforementioned state of the memory piece 30 is maintained even when the upper rail 4 moves to the foremost position thereof in a state where the memory piece 30 is fixed to the rearmost portion of the lower rail 3. That is, even when the upper rail 4 moves to the foremost position, at least the memory pin 33 is arranged at a front side of the rear end of the upper rail 4. Consequently, the memory piece 30 is prevented from being exposed beyond the rear end of the upper rail 4. At this time, a space is ensured at a rear side of the seat 5 (the seat back 8) supported by the upper rail 4, thereby improving accessibility of a passenger, and the like, to the rear seat of the seat 5, for example.

In a case where the flanges 43 of the foremost stopper bracket 41 engage with the cut and lift pieces 46 in association with the forward movement of the upper rail 4 relative to the lower rail 3, lower ends of the hook portions 43c engage with the upper surface of the bottom wall portion 12 of the lower rail 3, thereby avoiding the foremost stopper bracket 41 to rotate relative to the lower rail 3. Thus, the foremost stopper bracket 41 is prevented from being deformed due to a load generated when the cut and lift pieces 46 engage with the flanges 43.

Afterwards, in a case where the upper rail 4 moves rearward while the seat back 8 is being folded forward, the front holding portions 52a of the front stopper bracket 50 make contact with the contact portions 31e of the memory piece 30 that is fixed to the lower rail 3, thereby once stopping the movement of the upper rail 4. As a result, the upper rail 4 returns to the memory position. Then, when the seat back 8 is pulled up, the contact piece 26d of the lock lever 26 is released from the contact piece 71a of the release lever 71 so that the relative movement between the lower rail 3 and the upper rail 4 is restricted at the memory position. When the seat back 8 is pulled up in a state where the upper rail 4 is in an arbitrary position between the foremost position to the memory position, the relative movement between the lower rail 3 and the upper rail 4 is also restricted.

Next, a method for assembling the memory piece 30 will be explained with reference to FIGS. 14A, 14B, and 14C. According to the present embodiment, the memory piece 30 is assembled without being restricted by an assembly process of the lower rail 3 and the upper rail 4. In the following, a process after the lower rail 3 and the upper rail 4 are assembled will be explained.

As illustrated in FIG. 14A, in a case where the memory piece 30 is assembled on the lower rail 3 and the upper rail 4, the upper rail 4 is arranged at the foremost position relative to the lower rail 3. At this time, a front end portion of the rear end engagement bore 37 in a plan view is covered by the upper rail 4 while a rear end portion of the rear end engagement bore 37 in the plan view is exposed to the rear side of the upper rail 4. In the aforementioned state, the memory piece 30 is placed on the bottom wall portion 12 of the lower rail 3 so that the engagement portion 33b of the memory pin 33 is positioned at the rear end portion of the rear end engagement bore 37 while an interference between the rear end of the upper rail 4 and the projecting portion 31b of the slider body 31 is avoided. At this time, the projecting portion 31b is inserted into the rail cross section of the upper rail 4.

Next, in a state where the memory pin 33 is retracted within the slider body 31 so that the engagement portion 33b is fitted to the rear end portion of the rear end engagement bore 37, the memory piece 30 is moved forward until the engagement portion 33b is fitted to the front end portion of the rear end engagement bore 37 as illustrated in FIG. 14B, thereby inserting the memory pin 33 into the rail cross section of the upper rail 4. At this time, the upper surface of the head portion 33a is pressed by the pressing surface 61a positioned at the rear end portion of the upper rail 4, thereby maintaining the lower end of the engagement portion 33b to be fitted to the front end portion of the rear end engagement bore 37.

Then, as illustrated in FIG. 14C, when the foremost stopper bracket 41 is tightened by the rearmost stopper pin 40 to the lower surface of the bottom wall portion 12 of the lower rail 3, the portion of the rear end engagement bore 37 that extends rearward from the point away from the adjacent engagement bore 12a by the predetermined interval is covered so as to open substantially in a circular shape matching the outer shape of the insertion bore 42b. Thus, the engagement portion 33b of the memory pin 33 fitted to the front end portion of the rear end engagement bore 37 is prevented from moving rearward (i.e., prevented from moving towards the rear end portion of the rear end engagement bore 37). As a result, the memory piece 30 (the memory pin 33) inserted into the rail cross section of the upper rail 4 is prevented from being dislocated from the lower rail 3, and the like.

Thereafter, the upper rail 4 is moved to the rearmost position so that the memory piece 30 fixed to the lower rail 3 at the rearmost position is guided by the pressing surface 61a and the inclination surface 53a, and is then held by the front stopper bracket 50

According to the aforementioned embodiment, at the time of the assembly of the memory piece 30, the engagement portion 33b of the memory pin 33 is fitted to the rear end portion of the rear end engagement bore 37 that is exposed to the rear side of the upper rail 4, which is arranged at the foremost position relative to the lower rail 3. Then, the memory piece 30 is moved forward until the engagement portion 33b is fitted to the front end portion of the rear end engagement bore 37 so that the memory piece 30 is inserted into the rail cross section of the upper rail 4 and is held by the pressing surface 61a of the memory holding bracket 60. Thereafter, the rearward movement of the engagement portion 33b of the memory pin 33 that is fitted to the front end portion of the rear end engagement bore 37 is blocked by the foremost stopper bracket 41. As a result, the memory piece 30 inserted into the upper rail 4, and the like is prevented from moving rearward and being dislocated. Accordingly, even after the assembly of the lower rail 3 and the upper rail 4, the memory piece 30 is easily assembled. The assembly of the memory piece 30 is not restricted by the assembly process of the lower rail 3 and the upper rail 4, which may lead to an improvement of the assembly performance of the memory piece 30. In addition, the memory piece 30 inserted into the upper rail 4, and the like is prevented from being exposed beyond the rear end of the upper rail 4 even when the upper rail 4 is arranged at the foremost position relative to the lower rail 3 by the walk-in operation, which may achieve an improved appearance. Further, because the exposure of the memory piece 30 is restrained, a contact thereof relative to a seat occupant may be prevented.

In addition, according to the aforementioned embodiment, in a case where the foremost stopper bracket 41 receives an external force from the memory pin 33 of the memory piece 30, for example, and is likely to deform, the hook portions 43c of the flanges 43 make contact with the bottom wall portion 12 of the lower rail 3 in front of the stopper insertion bores 39, thereby releasing the external force towards the lower rail 3. Thus, the deformation of the foremost stopper bracket 41 is restrained. The memory piece 30 arranged at the rearmost position, for example, is stably inserted into the engagement bore 12a (or the front end portion of the rear end engagement bore 37) accordingly.

Further, according to the aforementioned embodiment, each of the flanges 43 of the foremost stopper bracket 41 is also used as a stopper for blocking the forward movement of the upper rail 4, which leads to a reduction of the number of components. Specifically, in a case where the flanges 43 engage with the cut and lift pieces 46 in association with the forward movement of the upper rail 4, a moment of force is generated at the flanges 43, because of a load generated by the engagement of the flanges 43 with the cut and lift pieces 46, so as to rotate front portions of the flanges 43 towards the bottom wall portion 12 of the lower rail 3. However, the flanges 43 are prevented from rotating by a contact of the hook portions 43c with the bottom wall portion 12 of the lower rail 3 at the front side of the stopper insertion bores 39. As a result, the deformation and the like of the foremost stopper bracket 41 and of the attachment portion 42 because of rotations of the flanges 43 may be restrained. In addition, the flanges 43 securely receive a load generated by the engagement between the flanges 43 and the cut and lift pieces 46 in a direction where shear stress is applied, thereby sufficiently securing a strength of the flanges 43 with a simple structure. Further, because the upper rail 4 is stopped at the foremost position after the assembly of the foremost stopper bracket 41, the assembly performance of the memory piece 30 is further enhanced.

Furthermore, according to the aforementioned embodiment, the rearmost stopper pin 40 provided for tightening the foremost stopper bracket 41 to the bottom wall portion 12 of the lower rail 3 is also used as a stopper blocking the rearward movement of the upper rail 4, thereby reducing the number of components. In addition, a manufacturing cost may decrease as compared to a case where a portion of the lower rail 3 is cut and lifted up.

Specifically, the rearward movement of the upper rail 4 is blocked indirectly by the memory piece 30 disposed between the front stopper bracket 50 and the rearmost stopper pin 40. Thus, a movable range of the upper rail 4 relative to the lower rail 3 is easily changeable by an adjustment of a position where the memory piece 30 engages with the front stopper bracket 50 or the rearmost stopper pin 40, for example. A layout flexibility of the lower rail 3 and the upper rail 4 may also be improved. In addition, because the memory piece 30 that occupies the inner void S is used to block the rearward movement of the upper rail 4, a restriction of a space in the inner void S for arranging the memory piece 30, which may be caused in a case where a stopper is separately provided from the memory piece 30, is relieved.

Furthermore, according to the aforementioned embodiment, because the memory piece 30 is prevented from moving further forward than a predetermined position by the front stopper pin 36, a return position (i.e., the memory position) of the upper rail 4, where the memory piece 30 is again held by the front stopper bracket 50 so that the memory piece 30 integrally moves with the upper rail 4, is prevented from being specified to an excessively forward position. Thus, a space to get in and out of the seat 5 for the occupant seated thereon may be appropriately secured.

Furthermore, according to the aforementioned embodiment, the memory holding bracket 60 is made of a resin material or an elastic material to thereby achieve an easy manufacture thereof and an improved assembly performance.

The aforementioned embodiment may be modified as follows.

Each of the flanges 43 of the foremost stopper bracket 41 may serve as an individual functional portion for ensuring strength (preventing deformation) and be separated from the stopper.

The foremost stopper bracket 41 may be mounted at the upper surface of the bottom wall portion 12 unless interfering with the movement of the memory piece 30, and the like. The movement of the upper rail 4 may be stopped at the rearmost position by a direct engagement with an appropriate stopper, without contacting with the memory piece 30.

The cut and lift piece 46 may be formed at only one side of the upper rail 4 in the width direction, and the flange 43 that is engageable with the cut and lift piece 46 may be formed at only one side of the foremost stopper bracket 41 in the width direction.

A bolt, instead of the rearmost stopper pin 40, may be provided. A vertical positional relationship between the lower rails 3 and the upper rails 4 may be specified in an opposite manner. That is, the upper rails 4 may be fixed to the vehicle floor 2 while the lower rails 3 may be fixed to the seat 5. The single lower rail 3 and the single upper rail 4 may be provided at the seat 5, or three or more of the lower rails 3 and the upper rails 4 may be provided at the seat 5.

The movement of the seat 5 in association with the movement of the upper rail 4 relative to the lower rail 3 may correspond to the width direction of the vehicle.

According to the aforementioned embodiment, at the time of the assembly of the memory piece 30, the memory piece 30 first engages with the rear end portion of the rear end engagement bore 37 that is exposed to the rear side of the upper rail 4, which is arranged at the foremost position relative to the lower rail 3. In the aforementioned state, the memory piece 30 is moved forward until engaging with the front end portion of the rear end engagement bore 37 so that the memory piece 30 is inserted into the upper rail 4 and is held by the memory holding bracket 60. Then, the memory piece 30 fitted to the front end portion of the rear end engagement bore 37 is restricted from moving towards the rear end portion thereof, thereby preventing the memory piece 30 that is inserted into the upper rail 4 from moving rearward and disengaging from the upper rail 4. Accordingly, even after the lower rail 3 and the upper rail 4 are assembled, the memory piece 30 is easily assembled, i.e., the assembly of the memory piece 30 is not interfered by the assembly process of the lower rail 3 and the upper rail 4, thereby improving the assembly performance of the memory piece 30. In addition, the memory piece 30 that is inserted within the upper rail 4 is restrained from being exposed to the rear side of the rear end of the upper rail 4 even when the upper rail 4 is arranged at the foremost position relative to the lower rail 3, thereby improving an appearance.

The foremost stopper bracket 41 includes the attachment portion 42 being in contact with the outer surface (i.e., the lower surface) of the bottom wall portion 12 of the upper rail 3 to restrict the movement of the memory piece 30 that engages with the front end portion of the rear end engagement bore 37 towards the rear end portion thereof. The foremost stopper bracket 41 includes the flange 43 that extends from a front end of the attachment portion 42 to project within the inner void S by penetrating through the insertion bore 39 formed at the bottom wall portion 12. The flange 43 includes the hook portion 43c that makes contact with the bottom wall portion 12 of the lower rail 3 at a front side of the insertion bore 39 in the inner void S.

Therefore, even when the attachment portion 42 of the foremost stopper bracket 41 is likely to deform by receiving an external force, and the like, the hook portions 43c make contact with the bottom wall portion 12 of the lower rail 3 at the front side of the stopper insertion bores 39. As a result, the external force, and the like is released to the lower rail 3. Accordingly, the deformation of the foremost stopper bracket 41 is restrained. For example, the memory piece 30 that is arranged at the rearmost position may be stably fitted to one of the engagement bores 12a or the front end portion of the rear end engagement bore 37.

The upper rail 4 includes the cut and lift piece 46 which extends within the inner void S and with which the flange 43 engages so as to stop a forward movement of the upper rail 4.

Accordingly, the flange 43 is also used as a stopper for stopping the forward movement of the upper rail 4, thereby reducing the number of components. Specifically, in a case where the flanges 43 engage with the cut and lift pieces 46 in association with the relative movement between the lower rail 3 and the upper rail 4, a moment of force is generated at the flanges 43, because of a load generated by the engagement of the flanges 43 with the cut and lift pieces 46, so as to rotate front portions of the flanges 43 towards the bottom wall portion 12 of the lower rail 3. However, the flanges 43 are prevented from rotating by a contact of the hook portions 43c with the bottom wall portion 12 of the lower rail 3 at the front side of the stopper insertion bores 39. As a result, the deformation and the like of the foremost stopper bracket 41 because of rotations of the flanges 43 may be restrained.

The foremost stopper bracket 41 is tightened to the bottom wall portion 12 of the upper rail 3 by the rearmost stopper pin 40 that is arranged at a rear side of the memory piece 30, the rearmost stopper pin 40 engaging with the upper rail 4 via the memory holding bracket 60 and the memory piece 30 to stop a rearward movement of the upper rail 4.

Accordingly, the rearmost stopper pin 40 provided for tightening the foremost stopper bracket 41 to the bottom wall portion 12 of the lower rail 3 is also used as a stopper blocking the rearward movement of the upper rail 4, thereby reducing the number of components.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle, comprising:
a first rail;
a second rail movable relative to the first rail;
a lock member restricting a relative movement between the first rail and the second rail;
a plurality of engagement bores formed at a bottom wall portion of the first rail at predetermined intervals in a longitudinal direction of the first rail and including a rear end engagement bore that extends in a rearward direction of the vehicle from a point away from one of the engagement bores arranged next to the rear end engagement bore by the predetermined interval, a front end portion of the rear end engagement bore being further positioned in a forward direction of the vehicle than a rear end of the second rail in a state where the second rail is positioned at a foremost position relative to the first rail, a rear end portion of the rear end engagement bore being exposed to a rear of the rear end of the second rail, the rear end engagement bore being arranged at a rearmost side among the engagement bores;
a memory member movably supported within an inner void that is formed between the first rail and the second rail in the longitudinal direction of the first rail, the memory member being prevented from moving by an engagement with one of the engagement bores;
a holding member fixed to the second rail and holding the memory member to move integrally with the second rail in a state where a restriction of the relative movement between the first rail and the second rail by the lock member is released on a basis of an operation of an operation handle, the holding member holding the memory member to engage with one of the engagement bores in a state where the restriction of the relative movement between the first rail and the second rail by the lock member is released in association with a forward folding operation of a seat back of a seat configured to be fixed to the second rail; and
an auxiliary bracket fixed to the bottom wall portion of the first rail and restricting a movement of the memory member that engages with the front end portion of the rear end engagement bore towards the rear end portion thereof.

2. The seat slide apparatus according to claim 1, wherein the auxiliary bracket includes an attachment portion being in contact with an outer surface of the bottom wall portion of the first rail to restrict the movement of the memory member that engages with the front end portion of the rear end engagement bore towards the rear end portion thereof, the auxiliary bracket including a flange that extends from a front end of the attachment portion to project within the inner void by penetrating through an insertion bore formed at the bottom wall portion, the flange including a hook portion that makes contact with the bottom wall portion of the first rail at a front side of the insertion bore in the inner void.

3. The seat slide apparatus according to claim 2, wherein the second rail includes a rail-side foremost stopper portion which extends within the inner void and with which the flange engages so as to stop a forward movement of the second rail.

4. The seat slide apparatus according to claim 1, wherein the auxiliary bracket is tightened to the bottom wall portion of the first rail by a tightening member that is arranged at a rear side of the memory member, the tightening member engaging with the second rail via the holding member and the memory member to stop a rearward movement of the second rail.

5. The seat slide apparatus according to claim 2, wherein the auxiliary bracket is tightened to the bottom wall portion of the first rail by a tightening member that is arranged at a rear side of the memory member, the tightening member engaging with the second rail via the holding member and the memory member to stop a rearward movement of the second rail.

6. The seat slide apparatus according to claim 3, wherein the auxiliary bracket is tightened to the bottom wall portion of the first rail by a tightening member that is arranged at a rear side of the memory member, the tightening member engaging with the second rail via the holding member and the memory member to stop a rearward movement of the second rail.

* * * * *